United States Patent
Han et al.

(10) Patent No.: US 10,618,412 B2
(45) Date of Patent: Apr. 14, 2020

(54) APPARATUS AND METHOD FOR CONTROLLING REGENERATIVE BRAKING OF VEHICLE

(71) Applicants: HYUNDAI MOTOR COMPANY, Seoul (KR); KIA MOTORS CORPORATION, Seoul (KR)

(72) Inventors: Soo Lim Han, Hwaseong-si (KR); In Seok Park, Seoul (KR); Woo Cheol Cho, Daejeon (KR); Chang Yu Kim, Bucheon-si (KR); Seung Jae Yoo, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 127 days.

(21) Appl. No.: 15/960,888

(22) Filed: Apr. 24, 2018

(65) Prior Publication Data
US 2019/0202296 A1    Jul. 4, 2019

(30) Foreign Application Priority Data

Dec. 28, 2017 (KR) .......................... 10-2017-0182246

(51) Int. Cl.
B60L 7/18 (2006.01)

(52) U.S. Cl.
CPC ............. B60L 7/18 (2013.01); *B60L 2260/42* (2013.01)

(58) Field of Classification Search
CPC ........................................................ B60L 7/18
See application file for complete search history.

(56) References Cited

U.S. PATENT DOCUMENTS

| 8,016,367 | B2 * | 9/2011 | Hirata | B60K 6/48 303/151 |
| 9,321,355 | B1 * | 4/2016 | Shah | B60L 7/18 |
| 9,919,603 | B2 * | 3/2018 | Yamakado | B60L 3/0015 |
| 9,944,185 | B2 * | 4/2018 | Oguri | B60L 7/18 |
| 10,155,447 | B2 * | 12/2018 | Imanishi | B60T 1/10 |
| 2002/0167221 | A1 * | 11/2002 | Kosik | B60K 6/48 303/152 |
| 2009/0118887 | A1 * | 5/2009 | Minarcin | B60L 7/26 701/22 |
| 2015/0019058 | A1 * | 1/2015 | Georgiev | B60L 7/18 701/22 |

(Continued)

FOREIGN PATENT DOCUMENTS

WO    WO-2017129091 A1 *  8/2017  ............... B60T 7/12

*Primary Examiner* — Alex C Dunn
(74) *Attorney, Agent, or Firm* — Morgan, Lewis & Bockius LLP

(57) ABSTRACT

An apparatus for controlling a regenerative braking of a vehicle includes a sensor detecting information about forward driving environment, and a controller configured to: calculate an estimated time-to-collision between a forward vehicle and an ego vehicle when the forward vehicle is detected by the sensor, compare a first regenerative braking level determined based on the estimated time-to-collision with a second regenerative braking level determined based on distance information about the forward vehicle; determine a final regenerative braking level depending on the compared result; and control a regenerative braking drive based on the determined final regenerative braking level.

20 Claims, 15 Drawing Sheets

(56) References Cited

U.S. PATENT DOCUMENTS

| | | | |
|---|---|---|---|
| 2015/0100214 A1* | 4/2015 | Huh | B60L 7/18 |
| | | | 701/70 |
| 2016/0264003 A1* | 9/2016 | Yokoyama | B60K 6/52 |
| 2016/0347181 A1* | 12/2016 | Yamakado | B60L 3/0015 |
| 2017/0015203 A1* | 1/2017 | Oguri | B60L 7/18 |
| 2018/0118034 A1* | 5/2018 | Zenner | B60L 7/26 |
| 2019/0031190 A1* | 1/2019 | Choi | B60W 30/095 |
| 2019/0061763 A1* | 2/2019 | Takeda | B60L 50/15 |
| 2019/0176827 A1* | 6/2019 | Han | B60W 30/18127 |
| 2019/0232789 A1* | 8/2019 | Kinoshita | B60L 7/16 |

\* cited by examiner

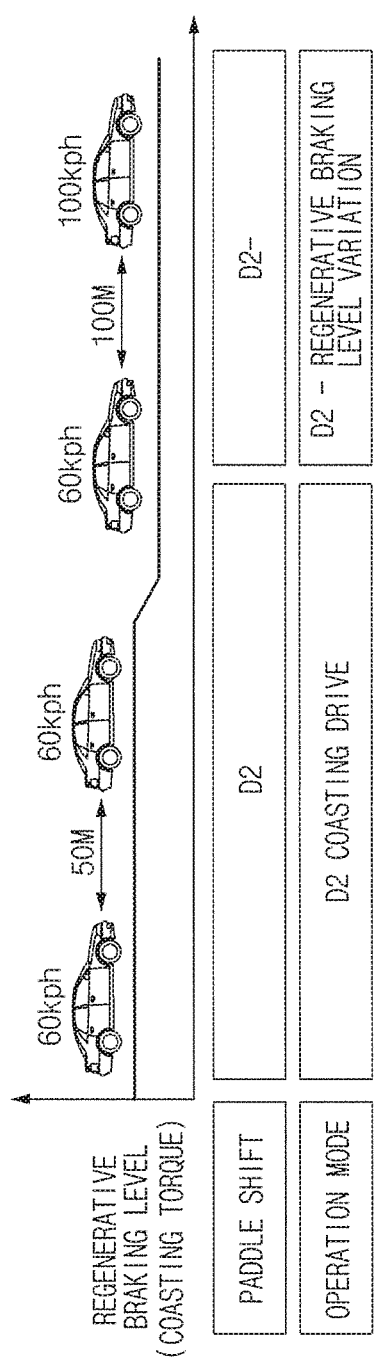
F I G. 8A

APPARATUS AND METHOD FOR CONTROLLING REGENERATIVE BRAKING OF VEHICLE

CROSS-REFERENCE TO RELATED APPLICATION

This application is based on and claims the benefit of priority to Korean Patent Application No. 10-2017-0182246, filed on Dec. 28, 2017, in the Korean Intellectual Property Office, the disclosure of which is incorporated herein in its entirety by reference.

TECHNICAL FIELD

The present disclosure relates to an apparatus and a method for controlling a regenerative braking of a vehicle.

BACKGROUND

In general, an eco-friendly vehicle, such as an electric vehicle, a hybrid vehicle, etc., is braked by a regenerative braking using a brake hydraulic pressure and a motor.

The eco-friendly vehicle includes a paddle shift to control a regenerative braking level. Accordingly, a driver controls the regenerative braking level by operating (+) and (−) buttons of the paddle shift.

However, it is difficult for a driver to accurately determine which regenerative braking level is required. In addition, it is cumbersome to operate the buttons, e.g. (+) and (−), of the paddle shift one by one for controlling the regenerative braking level.

SUMMARY

The present disclosure has been made to solve the above-mentioned problems occurring in the prior art while advantages achieved by the prior art are maintained intact.

An aspect of the present disclosure provides an apparatus and a method for controlling a regenerative braking of a vehicle, which are capable of minimizing the number of paddle shift operations, accelerator operations, and brake operations by automatically controlling a regenerative braking level based on a forward driving environment to improve a driver's convenience.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a regenerative braking control apparatus includes a sensor detecting information about forward driving environment, and a controller configured to: calculate an estimated time-to-collision between a forward vehicle and an ego vehicle when the forward vehicle is detected by the sensor, compare a first regenerative braking level determined based on the estimated time-to-collision with a second regenerative braking level determined based on distance information about the forward vehicle; determine a final regenerative braking level according to the compared result; and control a regenerative braking drive based on the determined final regenerative braking level.

When the estimated time-to-collision is within a reference time-to-collision, the controller determines the first regenerative braking level based on a relative distance between the forward vehicle and the ego vehicle and a relative speed between the forward vehicle and the ego vehicle.

The controller determines the regenerative braking level corresponding to the relative distance and the relative speed based on first map data that define regenerative braking levels depending on the relative speed by the relative distance.

When the estimated time-to-collision exceeds a reference time-to-collision, the controller determines the first regenerative braking level to a level 0.

When a relative distance between the forward vehicle and the ego vehicle is within a reference dangerous distance, the controller determines the second regenerative braking level based on the relative distance between the forward vehicle and the ego vehicle.

The controller determines the regenerative braking level corresponding to the relative distance based on second map data that define regenerative braking levels depending on the relative distance by a speed of the ego vehicle.

When the relative distance between the forward vehicle and the ego vehicle exceeds the predetermined reference dangerous distance, the controller determines the second regenerative braking level to a level 0.

When an upward event in which a relative distance and a relative speed decrease occurs, the controller upwardly controls at least one of the first regenerative braking level and the second regenerative braking level to be an upper level.

When a downward event in which a relative distance and a relative speed increase occurs, the controller downwardly controls at least one of the first regenerative braking level and the second regenerative braking level to be a lower level.

When a paddle shift is operated, the controller determines the final regenerative braking level based on the operation of the paddle shift.

According to another aspect of the present disclosure, a method for controlling a regenerative braking of a vehicle includes: detecting, by a sensor, information about forward driving environment, calculating, by a controller, an estimated time-to-collision between a forward vehicle and an ego vehicle when the forward vehicle is detected in the detecting of the information, comparing, by the controller, a first regenerative braking level determined based on the estimated time-to-collision with a second regenerative braking level determined based on distance information about the forward vehicle to determine a final regenerative braking level according to the compared result, and controlling, by the controller, a regenerative braking drive based on the determined final regenerative braking level.

According to the above, the regenerative braking control apparatus and method automatically control the regenerative braking level based on the manual input by the paddle shift and the forward driving environment.

In addition, since the regenerative braking level is automatically controlled based on the forward driving environment, the number of operations with respect to the paddle shift, the accelerator, and the brake is minimized, and thus the convenience of the driver enhances.

BRIEF DESCRIPTION OF THE DRAWINGS

The above and other objects, features and advantages of the present disclosure will be more apparent from the following detailed description taken in conjunction with the accompanying drawings:

FIGS. 3 to 6, 7A-7C, and 8A-8C are views illustrating an operation of a regenerative braking control apparatus according to an exemplary embodiment of the present disclosure;

DETAILED DESCRIPTION

Figure 1:
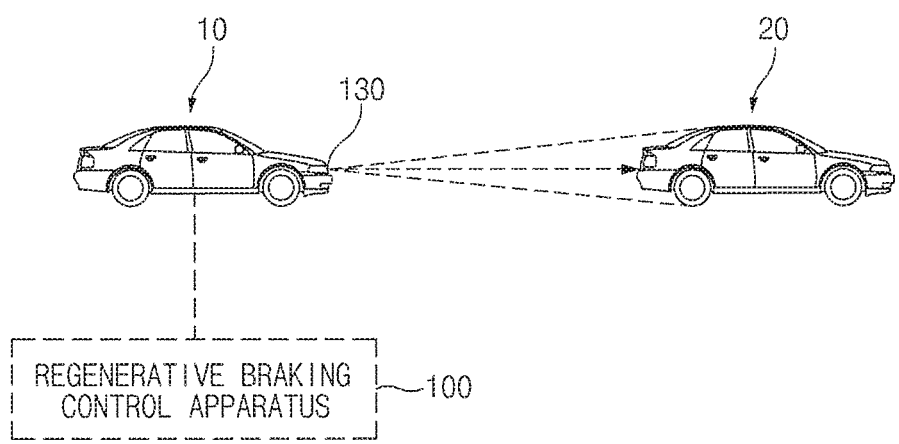
FIG. 1 is a view illustrating a vehicle to which a regenerative braking control apparatus is applied according to an exemplary embodiment of the present disclosure.

Hereinafter, exemplary embodiments of the present disclosure will be described in detail with reference to the accompanying drawings. In the drawings, the same reference numbers will be used throughout to designate the same or equivalent elements. In addition, a detailed description of well-known features or functions will be ruled out in order not to unnecessarily obscure the gist of the present disclosure.

In describing elements of exemplary embodiments of the present disclosure, the terms $1^{st}$, $2^{nd}$, first, second, A, B, (a), (b), and the like may be used herein. These terms are only used to distinguish one element from another element, but do not limit the corresponding elements irrespective of the order or priority of the corresponding elements. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is a view illustrating a vehicle to which a regenerative braking control apparatus is applied according to an exemplary embodiment of the present disclosure.

Referring to FIG. 1, a regenerative braking control apparatus 100 detects a forward vehicle 20 using a sensor 130 installed at a front part of an ego vehicle 10 and measures a relative distance and a relative speed between the ego vehicle 10 and the detected forward vehicle 20.

In this case, the regenerative braking control apparatus 100 calculates an estimated time-to-collision based on the relative distance and the relative speed between the ego vehicle 10 and the detected forward vehicle 20 and compares the calculated estimated time-to-collision with a reference time-to-collision to determine a regenerative braking level.

In addition, the regenerative braking control apparatus 100 may compare the relative distance between the ego vehicle 10 and the detected forward vehicle 20 with a reference dangerous distance to determine the regenerative braking level.

Here, the regenerative braking control apparatus 100 may compare the regenerative braking level determined based on the estimated time-to-collision with the regenerative braking level determined based on the relative distance to determine relatively higher regenerative braking level of the two regenerative braking levels as the regenerative braking level.

The configuration of the regenerative braking control apparatus 100 will be described in detail with reference to FIG. 2.

The regenerative braking control apparatus 100 according to the present disclosure may be implemented inside the ego vehicle 10. In this case, the regenerative braking control apparatus 100 may be integrally formed with internal controllers of the ego vehicle 10 or may be connected to the internal controllers of the ego vehicle 10 a separated apparatus.

Figure 2:
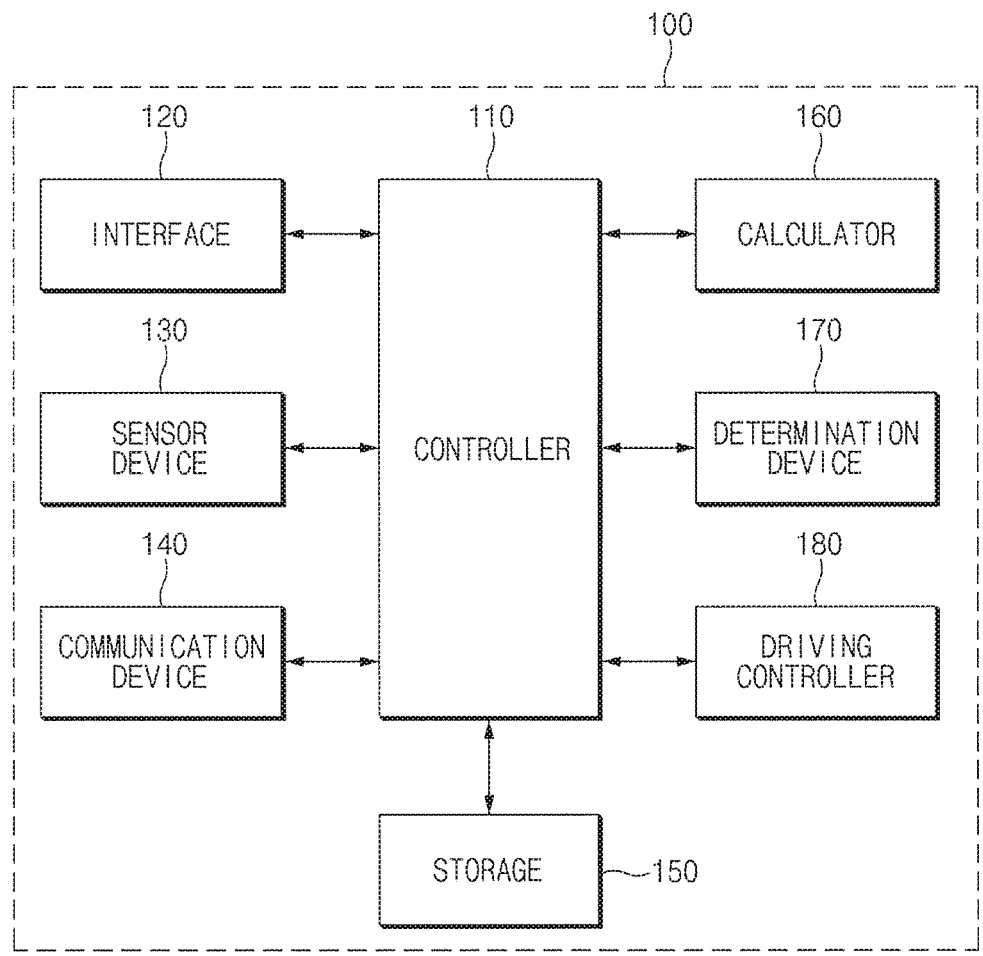
FIG. 2 is a view illustrating a configuration of a regenerative braking control apparatus according to an exemplary embodiment of the present disclosure.

FIG. 2 is a view illustrating the configuration of the regenerative braking control apparatus 100 according to an exemplary embodiment of the present disclosure.

Referring to FIG. 2, the regenerative braking control apparatus 100 may include a controller 110, an interface 120, a sensor 130, a communication device 140, a storage 150, a calculator 160, a determination device 170, and a driving controller 180. The controller 110, the calculator 160, and the driving controller 180 may be implemented by at least one processor.

The controller 110 may process signals applied to each component of the regenerative braking control apparatus 100.

The interface 120 may include an input device to receive a control instruction from a user and an output device to output an operation state of the regenerative braking control apparatus 100 and control results.

Here, the input device may include a key button, a mouse, a joystick, a jog shuttle, a stylus pen, and the like. In addition, the input device may include a soft key implemented on a display. Further, the input device may include a paddle shift installed in the ego vehicle 10 to control the regenerative braking level.

The output device may include a display and a voice output device, such as a speaker. In a case that a touch sensor, e.g., a touch film, a touch sheet, a touch pad, etc., is included in the display, the display may operate as a touch screen, and the display may be implemented in an integrated form of the input device and the output device.

In this case, the display may include at least one of a liquid crystal display (LCD), a thin film transistor-liquid crystal display (TF-LCD), an organic light-emitting diode (OLED), a flexible display, a field emission display (FED), or a three-dimensional (3D) display.

As an example, the display may be a screen installed in an instrument panel of the ego vehicle 10 or a navigation screen installed in the ego vehicle 10.

The sensor 130 may include one or more sensors installed at the front part of the ego vehicle 10 to detect the forward vehicle 20 and to measure a distance between the ego vehicle 10 and the detected forward vehicle 20. As an example, various sensors, such as a radar sensor, an ultrasonic wave sensor, a scanner, a camera, etc., may be used as the sensor. The sensor 130 may further include a sensor to detect a speed of the ego vehicle 10.

The communication device 140 is a hardware device capable of transmitting an analog or digital signal over wire or wirelessly and may include one or more components that enable communication with an external device. Examples of the communication device 140 include Bluetooth devices, infrared devices, modem, network card (using Ethernet), smartphone, Wi-Fi devices (using a Wi-Fi router), etc.

Here, the communication device 140 may include a communication module that supports a communication interface with electrical equipment and controllers included in the ego vehicle 10. The communication module may include a short-range communication module, wired communication module, wireless communication module, and the like, and may receive information detected by the sensors in the ego vehicle 10 and receive status information of the ego vehicle 10. In addition, the communication module may include a control circuit such as an integrated circuit (IC) chip.

The communication module may include a module supporting a vehicle network communication, such as a controller area network (CAN) communication, a local interconnect network (LIN) communication, a Flex-ray communication, etc.

The communication module may include a module for a wireless internet access or a module for a short range communication. As a wireless internet technology, a wireless LAN (WLAN), a wireless broadband (Wibro), a Wi-Fi, a world interoperability for microwave access (Wimax), and the like may be used, and a Bluetooth, a ZigBee, an ultra-wideband (UWB), a radio frequency identification (RFID), an infrared data association (IrDA), and the like may be used as a short range communication technology.

The storage 150 may store data and/or algorithms required to operate the regenerative braking control apparatus 100.

As an example, the storage 150 may store the detected information about the forward vehicle 20, which are provided from the sensor 130, and store the status information of the ego vehicle 10, e.g., vehicle speed information. In addition, the storage 150 may store information about the reference time-to-collision and the reference dangerous distance. Further, the storage 150 may store an algorithm that calculates the estimated time-to-collision from the detected information of the forward vehicle 20 and/or an algorithm that performs comparison and determination operations of the distance between vehicles and the estimated time-to-collision. Further, the storage 150 may store instructions and/or algorithms to set the regenerative braking level and to control the regenerative braking of the ego vehicle 10 depending on the set regenerative braking level.

In the present embodiment, the storage 150 may include a storage medium as a physical material that holds information, such as a random access memory (RAM), a static random access memory (SRAM) a read-only memory (ROM) a programmable read-only memory (PROM), an electrically erasable programmable read-only memory (EEPROM), etc.

The calculator 160 calculates the estimated time-to-collision based on the information about the forward vehicle 20 detected by the sensor 130 while the ego vehicle 10 travels.

The calculator 160 may calculate the estimated time-to-collision of the ego vehicle 10 with respect to the forward vehicle 20 based on a value obtained by multiplying the relative distance between the forward vehicle 20 and the ego vehicle 10 by the relative speed.

In an exemplary embodiment, the calculator 160 may be a hardware device such as an electronic device for performing calculating and may include an input, an output and a processor chip. The calculator 160 may further include a storage for storing numbers. Here, the calculator 160 may be connected as a separate device or embedded in the controller 110.

Figure 3:
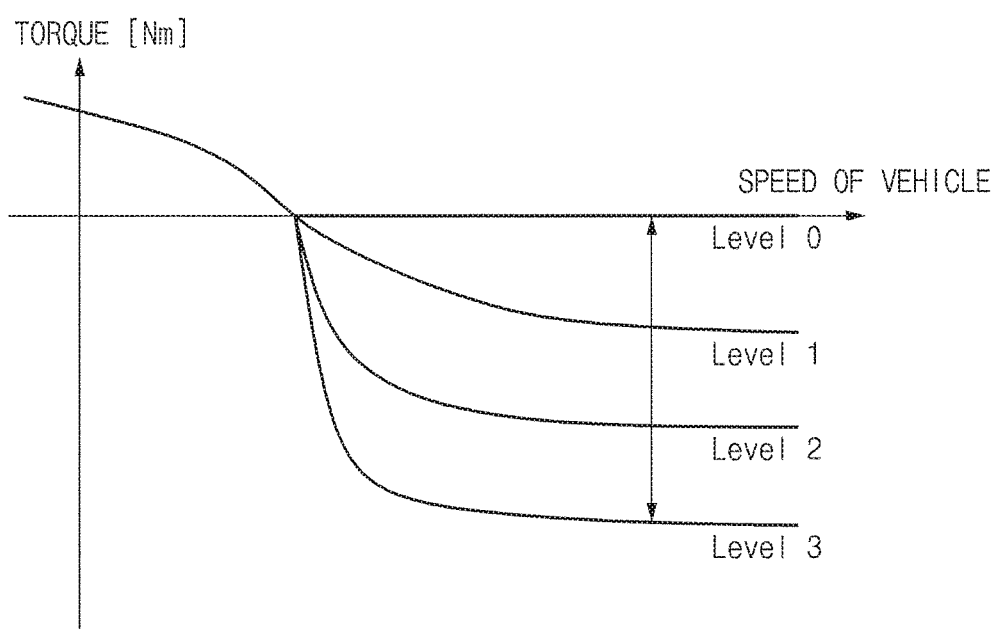

Referring to FIG. 3, the determination device 170 determines the regenerative braking level. The regenerative braking level may be divided into a level 0 (Level 0), a level 1 (Level 1), a level 2 (Level 2, and a level 3 (Level 3). In this case, the level 0 (Level 0) indicates a level at which the ego vehicle 10 drives with only a coasting operation without using the regenerative braking, and the level 3 (Level 3) indicates a level in which a charging operation using a braking energy generated during deceleration is performed at a maximum value. As the regenerative braking level increases, a charge amount increases, but a ride quality and comfort may be degraded by a braking force of a motor during the deceleration.

Figure 4:
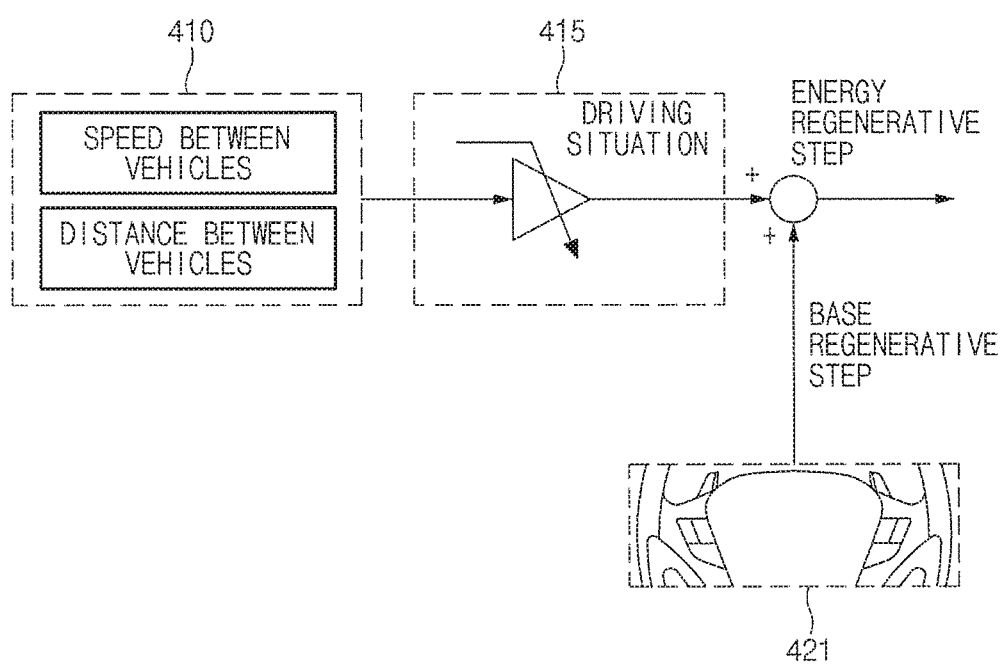

Accordingly, referring to FIG. 4, in a case that a manual input using the paddle shift does not occur, the determination device 170 determines the regenerative braking level 415 by taking into account forward driving environment information 410, such as the relative speed, the relative distance, etc.

The determination device 170 compares the estimated time-to-collision calculated by the calculator 160 with the reference time-to-collision to determine whether the estimated time-to-collision is within the reference time-to-collision.

When it is determined that the estimated time-to-collision is within the reference time-to-collision, the determination device 170 determines a first regenerative braking level corresponding to the estimated time-to-collision.

Here, the determination device 170 may determine the first regenerative braking level based on first map data that define regenerative braking levels depending on the relative speed by the relative distance between the forward vehicle 20 and the ego vehicle 10. As an example, the determination device 170 may determine the first regenerative braking level based on a graph shown in FIG. 5.

Figure 5:
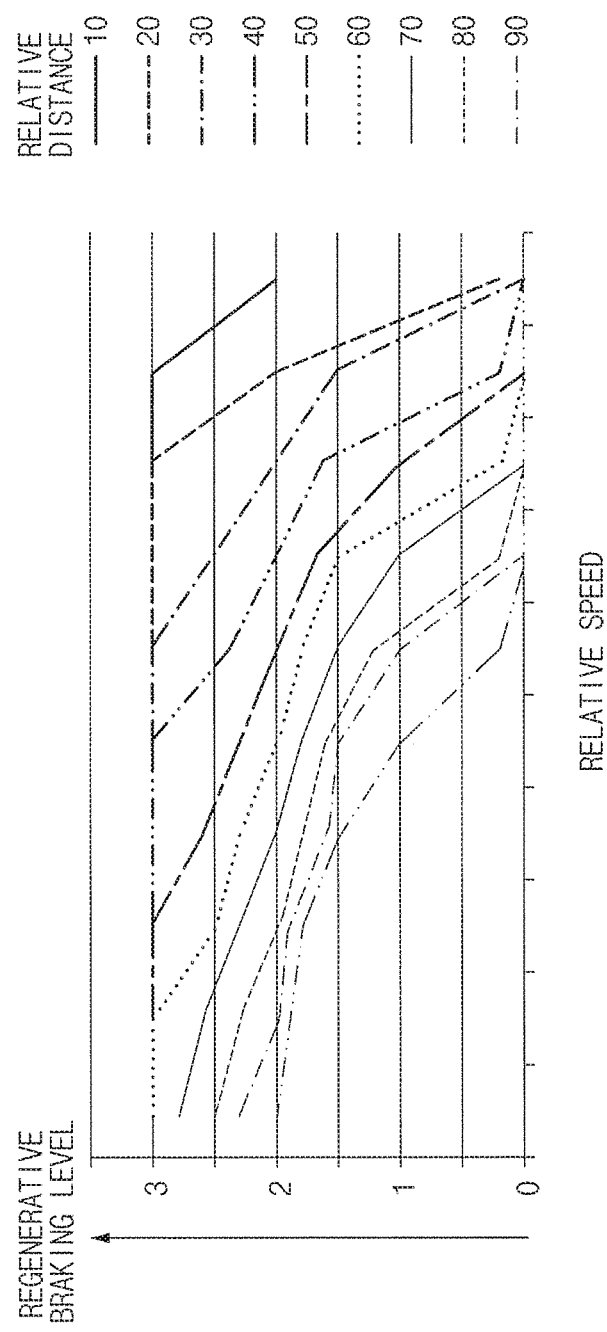

Referring to the graph shown in FIG. 5, the regenerative braking level increases as the relative speed decreases.

When it is determined that the estimated time-to-collision exceeds the reference time-to-collision, the determination device 170 determines the first regenerative braking level to the level 0 (Level 0).

In addition, the determination device 170 compares the relative distance between the forward vehicle 20 and the ego vehicle 10, which is detected by the sensor 130, with the predetermined reference dangerous distance to determine whether the relative distance is within the reference dangerous distance.

When it is determined that the relative distance is within the reference dangerous distance, the determination device 170 determines a second regenerative braking level corresponding to the relative distance between the forward vehicle 20 and the ego vehicle 10.

Here, the determination device 170 may determine the second regenerative braking level based on second map data that define the regenerative braking levels depending on the relative distance between the forward vehicle 20 and the ego vehicle 10 by the speed of the ego vehicle 10. As an example, the determination device 170 may determine the second regenerative braking level based on a graph shown in FIG. 6.

Figure 6:
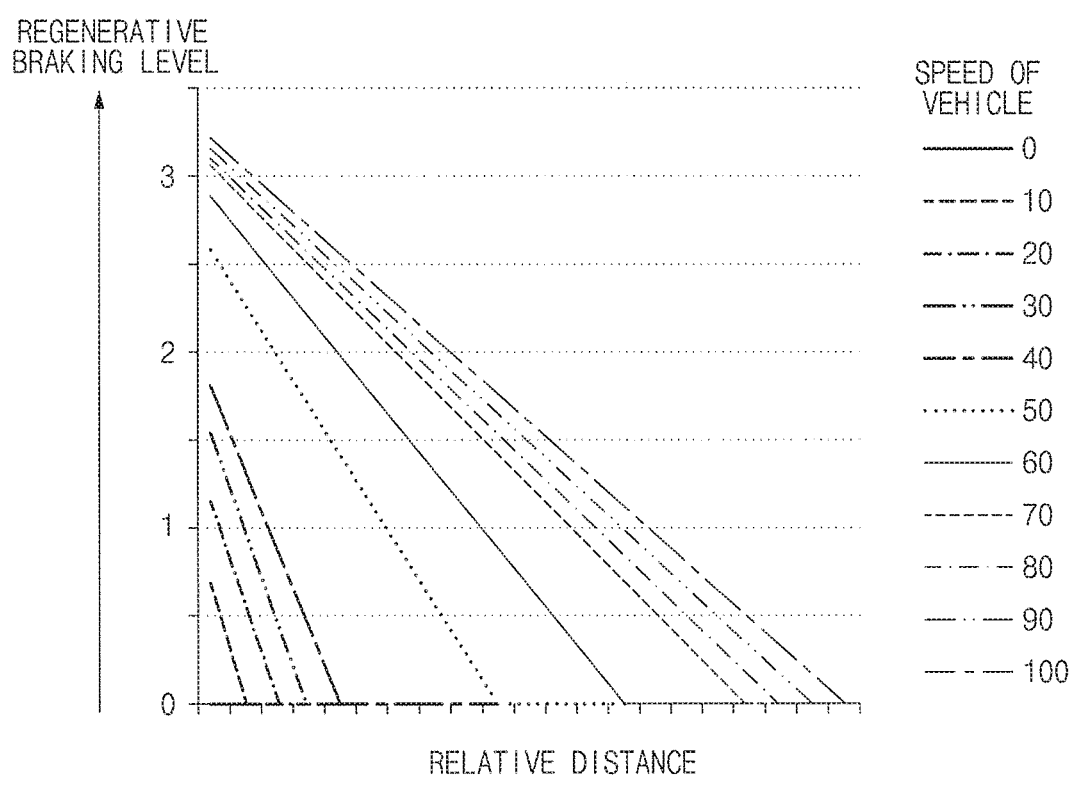

Referring to the graph shown in FIG. 6, the regenerative braking level increases as the relative distance decreases.

In addition, the determination device 170 may compare the first regenerative braking level with the second regenerative braking level to determine a relatively higher regenerative braking level of the first and second regenerative braking levels as the regenerative braking level.

Meanwhile, when it is determined that the relative distance exceeds the reference dangerous distance, the determination device 170 determines the second regenerative braking level to the level 0 (Level 0).

As shown in FIG. 4, in a case that the manual input 421 occurs by the paddle shift, the determination device 170 may determine the regenerative braking level by giving a priority to a value input by the paddle shift. The determination device 170 may determine whether buttons of the paddle shift are operated and determine the regenerative braking level in response to an operation of a (+) button or a (−) button of the paddle shift.

In addition, the determination device 170 may verify whether a brake pedal of the ego vehicle 10 is operated. In the case that the brake pedal is operated, the determination device 170 may determine the regenerative braking level based on a previous coasting torque.

The driving controller 180 sets the regenerative braking level determined by the determination device 170 and controls the regenerative braking of the ego vehicle 10 based on the set regenerative braking level.

Meanwhile, the determination device 170 may verify whether an accelerator pedal of the ego vehicle 10 is operated. When it is verified that the accelerator pedal of the ego vehicle 10 is operated, the determination device 170 may determine to terminate the regenerative braking control. Accordingly, the driving controller 180 terminates the regenerative braking.

In an exemplary embodiment, the determination device 170 and the driving controller 180 may be connected as separate devices or embedded in the controller 110, and the controller 110 may be an electronic control unit (ECU).

In addition, the various embodiments disclosed herein, including embodiments of the regenerative braking control apparatus 100 and/or elements thereof can be implemented using one or more processors coupled to a memory (or other non-transitory machine readable recording medium) storing computer-executable instructions for causing the processor(s) to perform the functions described above including the functions described in relation to the controller 110, the interface 120, the sensor 130, the communication device 140, the calculator 160, the determination device 170 and/or the driving controller 180.

Figure 7A:
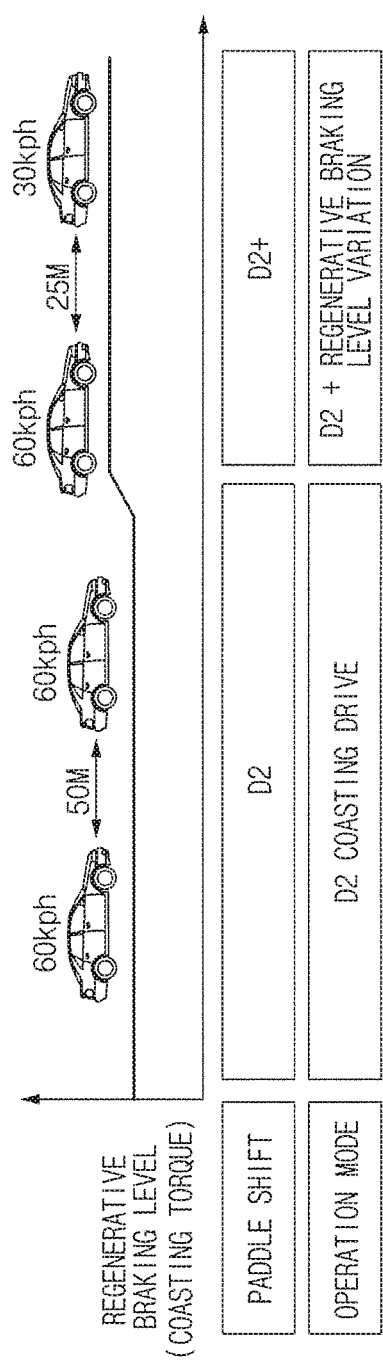
Figure 7B:
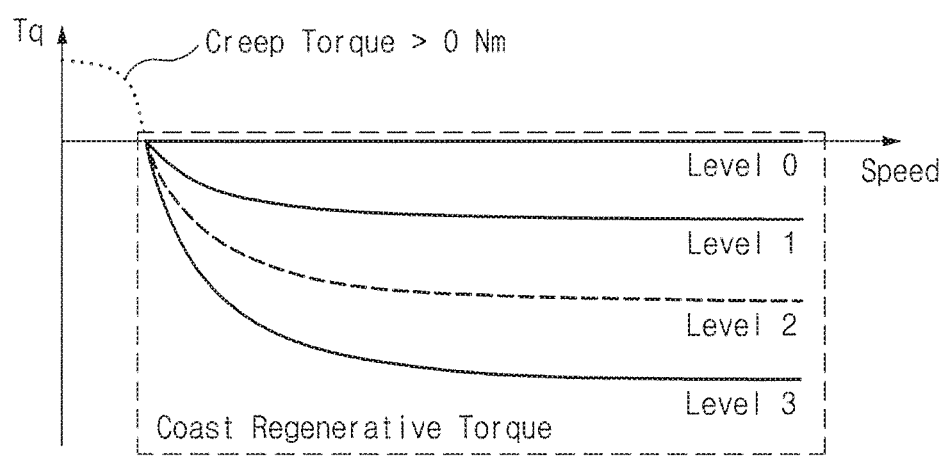
Figure 7C:
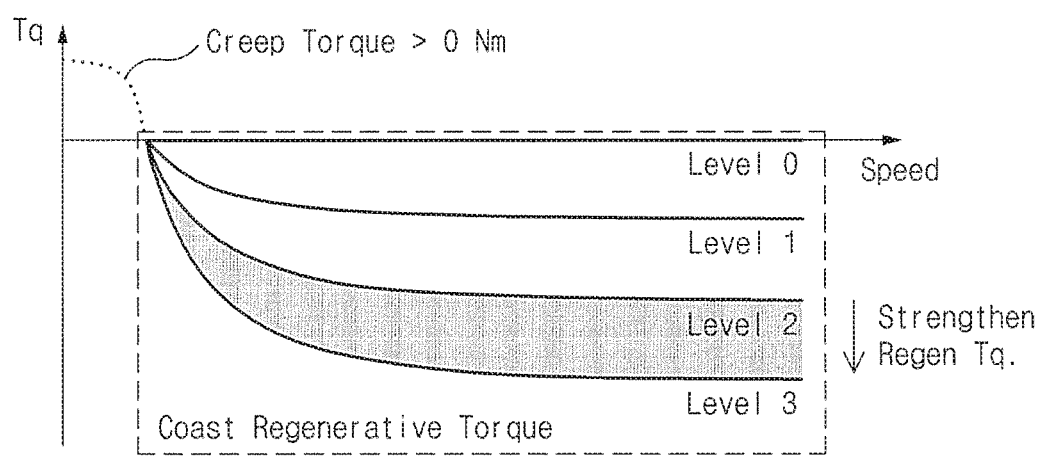

FIGS. 7A to 7C are views illustrating an upward control operation of the regenerative braking level.

First, FIG. 7A shows an exemplary embodiment in which the regenerative braking level is upwardly controlled depending on occurrence of upward event while the regenerative braking level is set to the level 2.

As shown in FIG. 7A, in a case that each of the ego vehicle 10 and the forward vehicle 20 drives at about 60 kph and the relative distance between the forward vehicle 20 and the ego vehicle 10 is about 50 m, the regenerative braking control apparatus 100 may set the regenerative braking level to the level 2 (Level 2), which is set as a default level, and control the regenerative braking based on the level 2 (Level 2) as shown in FIG. 7B.

When the speed of the forward vehicle 20 decreases to about 30 kph and the relative distance between the forward vehicle 20 and the ego vehicle 10 decreases to about 25 m, the upward event occurs. In this case, the regenerative braking control apparatus 100 may upwardly control the regenerative braking level to the level 3 (Level 3) from the level 2 (Level 2) as shown in FIG. 7C.

In the exemplary embodiment, the relative speed between the forward vehicle 20 and the ego vehicle 10 is about −30 kph, the relative distance between the forward vehicle 20 and the ego vehicle 10 is about 25 m, and the regenerative braking control apparatus 100 calculates the estimated time-to-collision based on the relative speed and the relative distance. When assuming that the reference time-to-collision is about 5 seconds, the regenerative braking control apparatus 100 may determine the first regenerative braking level by applying the relative speed and the relative distance to the graph shown in FIG. 5 since the calculated estimated time-to-collision is within a range of about 5 seconds.

In addition, when assuming that the reference dangerous distance is about 25 m, the regenerative braking control apparatus 100 may determine the second regenerative braking level by applying the relative distance to the graph shown in FIG. 6 since the relative distance is within the range of about 25 m.

In this case, the regenerative braking control apparatus 100 may set the regenerative braking level with reference to a relatively higher level of the first regenerative braking level and the second regenerative braking level and control the regenerative braking level based on the set regenerative braking level.

Figure 8B:
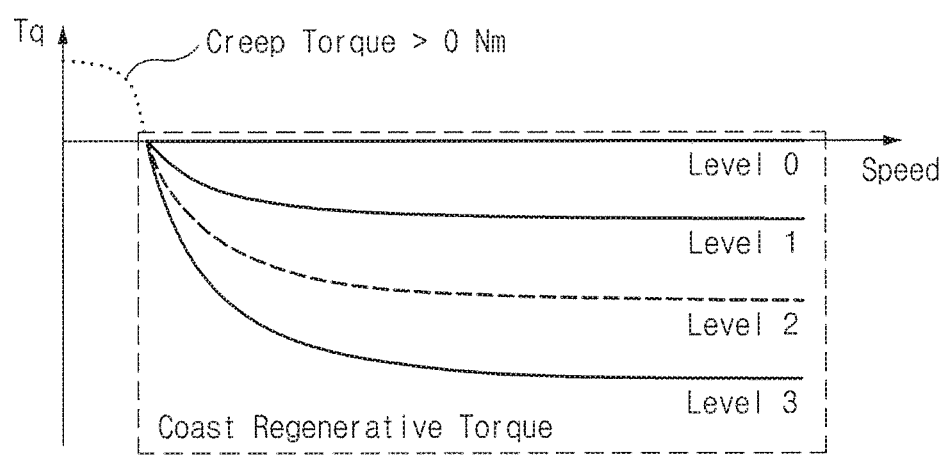
Figure 8C:
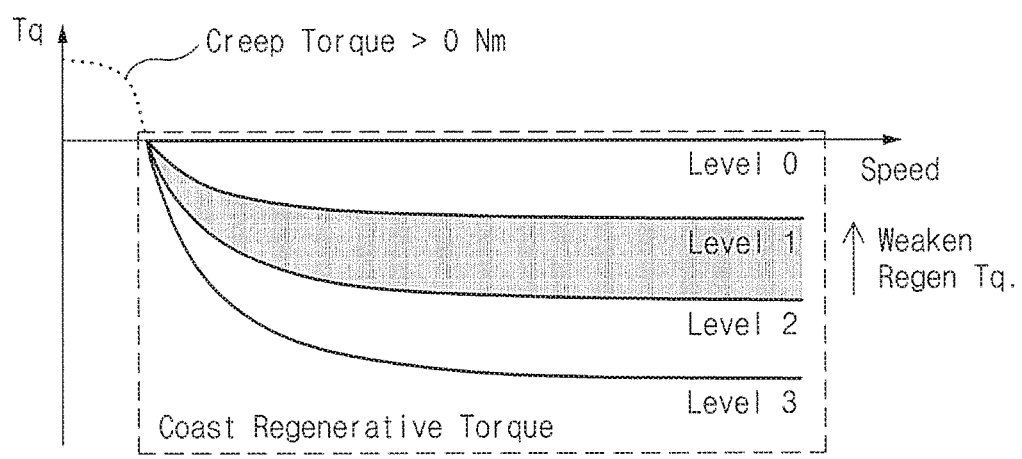

FIGS. 8A to 8C are views illustrating a downward control operation of the regenerative braking level.

First, FIG. 8A shows an exemplary embodiment in which the regenerative braking level is downwardly controlled depending on occurrence of downward event while the regenerative braking level is set to the level 2.

As shown in FIG. 8A, in a case that each of the ego vehicle 10 and the forward vehicle 20 drives at about 60 kph and the relative distance between the forward vehicle 20 and the ego vehicle 10 is about 50 m, the regenerative braking control apparatus 100 may set the regenerative braking level to the level 2 (Level 2), which is set as a default level, and control the regenerative braking based on the level 2 (Level 2) as shown in FIG. 8B.

In this case, in a case that the speed of the forward vehicle 20 increases to about 100 kph and the relative distance between the forward vehicle 20 and the ego vehicle 10 increases to about 100 m, the downward event occurs. Then, the regenerative braking control apparatus 100 may downwardly control the regenerative braking level to the level 1 (Level 1) from the level 2 (Level 2) as shown in FIG. 8C.

In the exemplary embodiment, the relative speed between the forward vehicle 20 and the ego vehicle 10 is about 40 kph, the relative distance between the forward vehicle 20 and the ego vehicle 10 is about 100 m, and the regenerative braking control apparatus 100 calculates the estimated time-to-collision based on the relative speed and the relative distance. When assuming that the reference time-to-collision is about 5 seconds, the regenerative braking control apparatus 100 may determine the first regenerative braking level by applying the relative speed and the relative distance to the graph shown in FIG. 5 since the calculated estimated time-to-collision is within a range of about 5 seconds.

In addition, when assuming that the reference dangerous distance is about 25 m, the regenerative braking control apparatus 100 may determine the second regenerative braking level to the level 0 (Level 0) since the relative distance exceeds about 25 m.

In this case, the regenerative braking control apparatus 100 may set the regenerative braking level to a higher level, i.e., the first regenerative braking level, of the first regenerative braking level and the second regenerative braking level and control the regenerative braking level based on the set regenerative braking level.

The regenerative braking control apparatus 100 operated as described above according to the present embodiment may be implemented in one independent hardware including a memory and a processor processing each operation and driven as a hardware while being included in other hardware, e.g., a microprocessor or a general-purpose computer system.

Hereinafter, an operation of the apparatus having the above-mentioned configurations according to the present disclosure will be described in detail.

Figure 9:
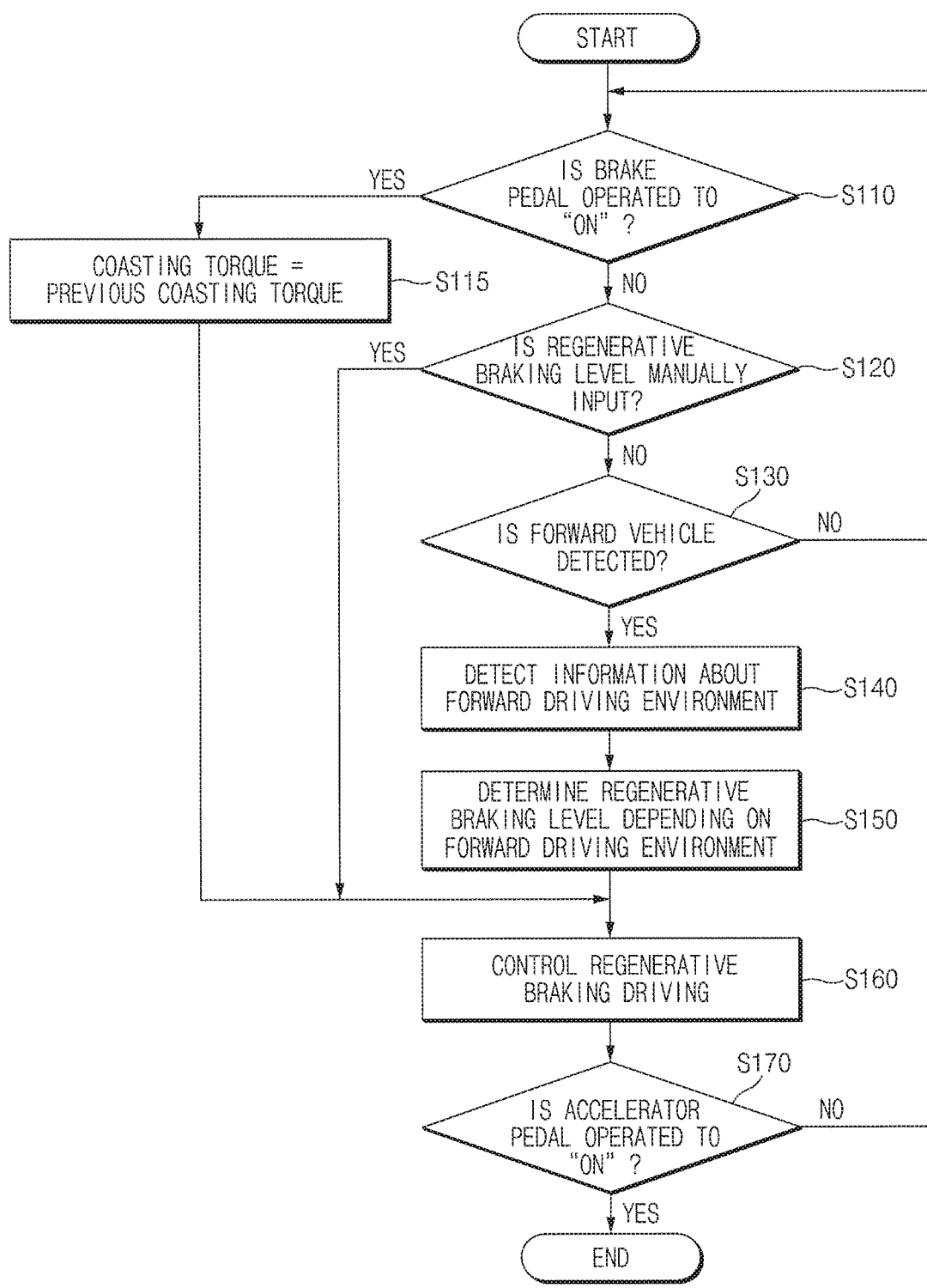
FIGS. 9 and 10 are flowcharts illustrating an operation of a regenerative braking control method according to an exemplary embodiment of the present disclosure.
Figure 10:
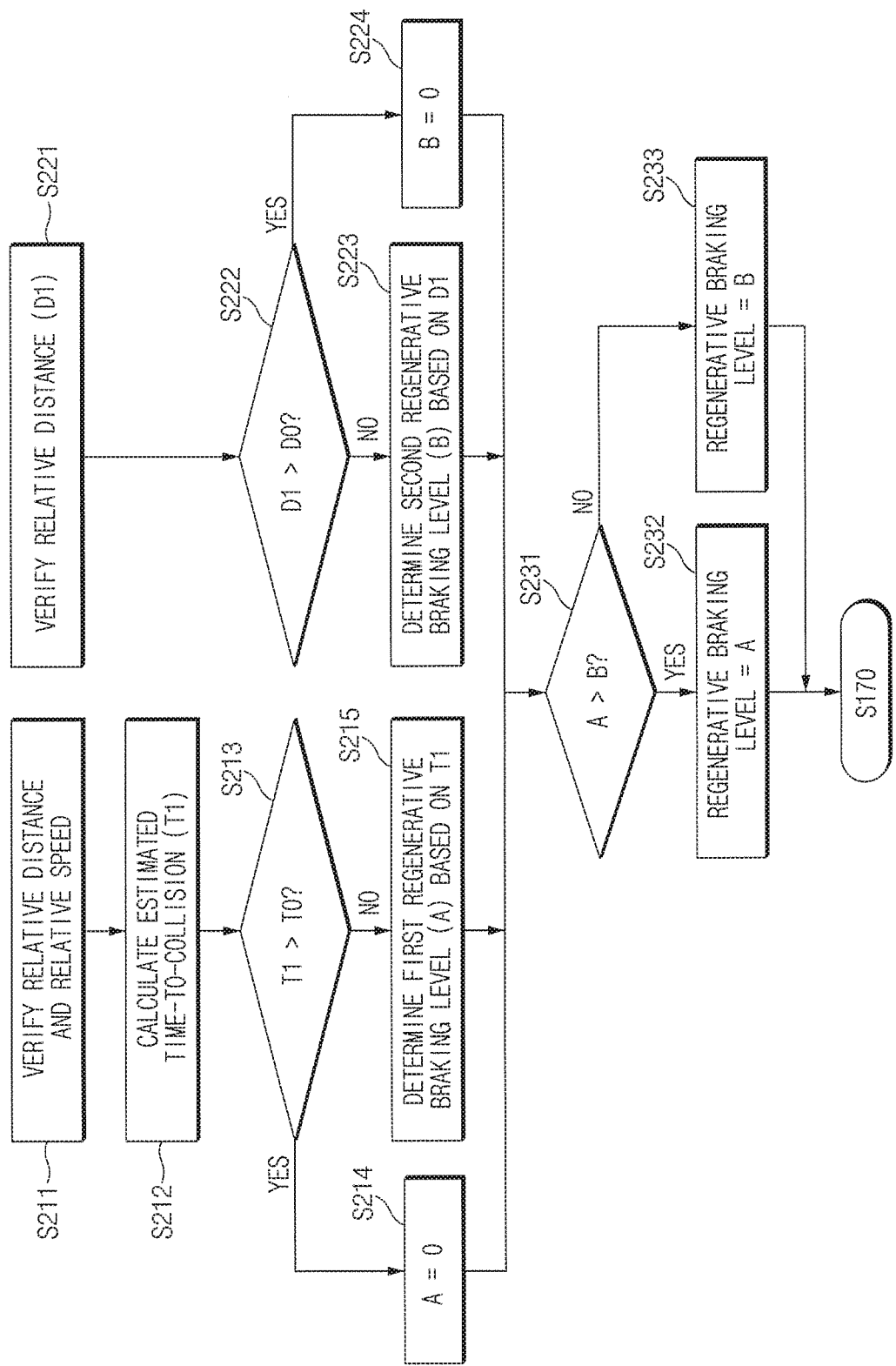

FIGS. 9 and 10 are flowcharts illustrating an operation of a regenerative braking control method according to an exemplary embodiment of the present disclosure. All of or a part of the steps method and/or operations of the foregoing embodiments can be realized using computer hardware and computer programs executed thereon.

Referring to FIG. 9, when the brake pedal of the ego vehicle 10 is operated to "ON" (S110), the regenerative braking control apparatus 100 determines the coasting torque, i.e., the regenerative braking level, to the regenerative braking level of the previous coasting torque (S115) and controls the regenerative braking level of the ego vehicle 10 based on the regenerative braking level determined in operation 'S115' (S160).

When the regenerative braking level is manually input by the paddle shift while the brake pedal is not operated to "ON" (S120), the regenerative braking control apparatus 100 controls a regenerative braking drive of the ego vehicle 10 based on the regenerative braking level manually input in operation 'S120' (S160).

Meanwhile, when the forward vehicle 20 is detected by the sensor installed at the front part of the ego vehicle 10 while the brake pedal is not operated to "ON" and the regenerative braking level is not manually input by the paddle shift (S130), the regenerative braking control apparatus 100 detects the information about forward driving environment with reference to the forward vehicle 20, e.g., the relative distance between the forward vehicle 20 and the ego vehicle 10, the relative speed between the forward vehicle 20 and the ego vehicle 10, the speed of the ego vehicle 10, etc. (S140), and determines the regenerative braking level based on the information about the forward driving environment detected in operation 'S140' (S150).

The operation 'S150' will be described in more detail with reference to FIG. 10.

Referring to FIG. 10, the regenerative braking control apparatus 100 verifies the relative distance and the relative speed, which are detected in operation 'S140' (S211), and calculates the estimated time-to-collision T1 between the forward vehicle 20 and the ego vehicle 10 based on the relative distance and the relative speed verified in operation 'S211' (S212).

In this case, when the estimated time-to-collision T1 calculated in operation 'S212' is within the predetermined reference time-to-collision T0 (S213), the regenerative braking control apparatus 100 determines the first regenerative braking level (A) based on the estimated time-to-collision T1, and when the estimated time-to-collision T1 calculated in operation 'S212' is not within the predetermined reference time-to-collision T0 (S213), the regenerative braking control apparatus 100 determines the first regenerative braking level (A) to the level zero (Level 0) (S214).

In addition, the regenerative braking control apparatus 100 verifies the relative distance D1 detected in operation 'S140' (S211).

In this case, when the relative distance D1 verified in operation 'S221' is within the predetermined reference dangerous distance D0 (S222), the regenerative braking control apparatus 100 determines the second regenerative braking level (B) based on the relative distance D1 (S223) and when the relative distance D1 verified in operation 'S221' is not within the predetermined reference dangerous distance D0 (S222), the regenerative braking control apparatus 100 determines the second regenerative braking level (B) to the level zero (Level 0) (S224).

The regenerative braking control apparatus 100 compares the first regenerative braking level (A) determined in operation S214 or S215 with the second regenerative braking level (B) determined in operation S223 or S224 and determines a final regenerative braking level with reference to the higher level of the first regenerative braking level (A) and the second regenerative braking level (B).

In other words, when the first regenerative braking level (A) determined in operation S214 or S215 is higher than the second regenerative braking level (B) determined in operation S223 or S224 (S231), the regenerative braking control apparatus 100 determines the regenerative braking level with reference to the first regenerative braking level (A) (S232), and when the first regenerative braking level (A) determined in operation S214 or S215 is not higher than the second regenerative braking level (B) determined in operation S223 or S224 (S231), the regenerative braking control apparatus 100 determines the regenerative braking level with reference to the second regenerative braking level (B) (S233).

When the final regenerative braking level is determined through operations shown in FIG. 10, the regenerative braking control apparatus 100 controls the regenerative braking drive of the ego vehicle 10 based on the determined regenerative braking level (S160).

Operations 'S110' to 'S160' are repeatedly performed while the accelerator pedal is not operated to "ON", and when the accelerator pedal is operated to "ON" (S170), operations of the regenerative braking control method are finished.

Figure 11:
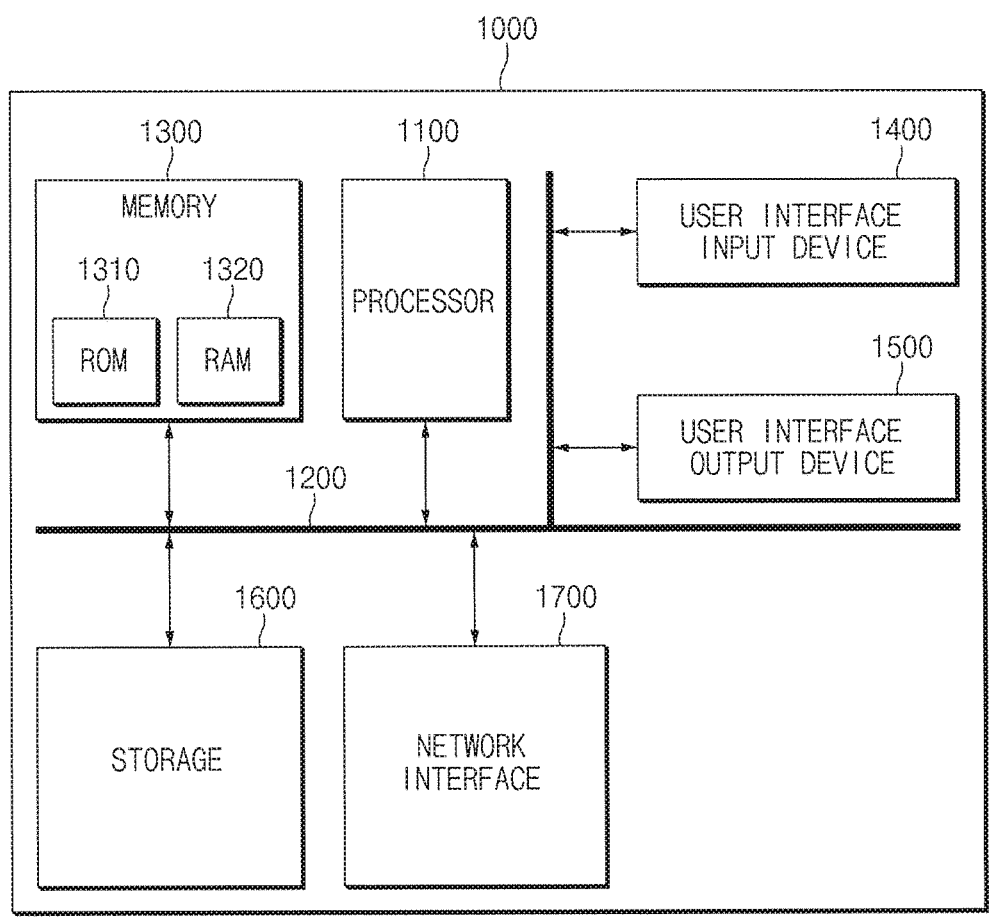
FIG. 11 is a block diagram illustrating a configuration of a computing system that executes a regenerative braking control method according to an exemplary embodiment of the present disclosure.

FIG. 11 is a block diagram illustrating a configuration of a computing system that executes a regenerative braking control method according to an exemplary embodiment of the present disclosure.

Referring to FIG. 11, a computing system 1000 may include at least one processor 1100, a memory 1300, a user interface input device 1400, a user interface output device 1500, a storage 1600, and a network interface 1700, which are connected with each other via a bus 1200.

The processor 1100 may be a central processing unit (CPU) or a semiconductor device for processing instructions stored in the memory 1300 and/or the storage 1600. Each of the memory 1300 and the storage 1600 may include various types of volatile or non-volatile storage media. For example, the memory 1300 may include a read only memory (ROM) 1310 and a random access memory (RAM) 1320.

Thus, the operations of the methods or algorithms described in connection with the embodiments disclosed in the specification may be directly implemented with a hardware module, a software module, or combinations thereof executed by the processor 1100. The software module may reside on a storage medium (i.e., the memory 1300 and/or the storage 1600), such as a RAM, a flash memory, a ROM, an erasable and programmable ROM (EPROM), an electrically EPROM (EEPROM), a register, a hard disc, a removable disc, or a compact disc-ROM (CD-ROM). The storage medium may be coupled to the processor 1100. The processor 1100 may read out information from the storage medium and may write information in the storage medium. Alternatively, the storage medium may be integrated with the processor 1100. The integrated processor and storage medium may reside in an application specific integrated circuit (ASIC). The ASIC may reside in a user terminal.

Alternatively, the integrated processor and storage medium may reside as a separate component in the user terminal.

While the present disclosure has been described with reference to exemplary embodiments, it will be apparent to those skilled in the art that various changes and modifications may be made without departing from the spirit and scope of the present disclosure.

Therefore, exemplary embodiments of the present disclosure are not limiting, but illustrative, and the spirit and scope of the present disclosure is not limited thereto. The spirit and scope of the present disclosure should be interpreted by the following claims, and it should be interpreted that all technical ideas which are equivalent to the present disclosure are included in the spirit and scope of the present disclosure.

What is claimed is:

1. A regenerative braking control apparatus comprising:
    a sensor configured to detect information about forward driving environment;
    a controller configured to:
        calculate an estimated time-to-collision between a forward vehicle and an ego vehicle when the forward vehicle is detected by the sensor;
        compare a first regenerative braking level determined based on the estimated time-to-collision with a second regenerative braking level determined based on distance information about the forward vehicle;
        determine a final regenerative braking level according to the compared result; and
        control a regenerative braking drive based on the determined final regenerative braking level.

2. The regenerative braking control apparatus of claim 1, wherein, when the estimated time-to-collision is within a reference time-to-collision, the controller determines the first regenerative braking level based on a relative distance and a relative speed between the forward vehicle and the ego vehicle.

3. The regenerative braking control apparatus of claim 2, wherein the controller is configured to determine the regenerative braking level corresponding to the relative distance and the relative speed based on first map data that define regenerative braking levels depending on the relative speed by the relative distance.

4. The regenerative braking control apparatus of claim 1, wherein, when the estimated time-to-collision exceeds a reference time-to-collision, the controller determines the first regenerative braking level to be a level 0 in a coasting mode.

5. The regenerative braking control apparatus of claim 1, wherein, when a relative distance between the forward vehicle and the ego vehicle is within a reference dangerous distance, the controller determines the second regenerative braking level based on the relative distance between the forward vehicle and the ego vehicle.

6. The regenerative braking control apparatus of claim 5, wherein the controller is configured to determine the regenerative braking level corresponding to the relative distance based on second map data that define regenerative braking levels depending on the relative distance by a speed of the ego vehicle.

7. The regenerative braking control apparatus of claim 1, wherein the controller determines the second regenerative braking level to be a level 0 in a coasting mode when a relative distance between the forward vehicle and the ego vehicle exceeds a reference dangerous distance.

8. The regenerative braking control apparatus of claim 1, wherein the controller is configured to upwardly control at least one of the first regenerative braking level and the second regenerative braking level to be an upper level to increase charging when an upward event, in which a relative distance and a relative speed between the forward vehicle and the ego vehicle decrease, occurs.

9. The regenerative braking control apparatus of claim 1, wherein the controller is configured to downwardly control at least one of the first regenerative braking level and the second regenerative braking level to be a lower level to decrease charging when a downward event, in which a relative distance and a relative speed between the forward vehicle and the ego vehicle increase, occurs.

10. The regenerative braking control apparatus of claim 1, wherein the controller is configured to determine the final regenerative braking level based on an operation of a paddle shift when the paddle shift is operated.

11. A method for controlling a regenerative braking of a vehicle, the method comprising steps of:
    detecting, by a sensor, information about forward driving environment;
    calculating, by a controller, an estimated time-to-collision between a forward vehicle and an ego vehicle when the forward vehicle is detected in the detecting of the information;
    comparing, by the controller, a first regenerative braking level determined based on the estimated time-to-collision with a second regenerative braking level determined based on distance information about the forward vehicle to determine a final regenerative braking level according to the compared result; and
    controlling, by the controller, a regenerative braking drive based on the determined final regenerative braking level.

12. The method of claim 11, wherein, when the estimated time-to-collision is within a reference time-to-collision, the step of determining the final regenerative braking level comprises determining the first regenerative braking level based on a relative distance and a relative speed between the forward vehicle and the ego vehicle.

13. The method of claim 12, wherein the step of determining the first regenerative braking level comprises determining the regenerative braking level corresponding to the relative distance and the relative speed based on first map data that define regenerative braking levels depending on the relative speed by the relative distance.

14. The method of claim 11, wherein, when the estimated time-to-collision exceeds a reference time-to-collision, the step of determining the final regenerative braking level comprises determining the first regenerative braking level to be a level 0 in a coasting mode.

15. The method of claim 11, wherein, when a relative distance between the forward vehicle and the ego vehicle is within a reference dangerous distance, the step of determining the final regenerative braking level comprises determining the second regenerative braking level based on the relative distance between the forward vehicle and the ego vehicle.

16. The method of claim 15, wherein the step of determining the second regenerative braking level comprises determining the regenerative braking level corresponding to the relative distance based on second map data that define regenerative braking levels depending on the relative distance by a speed of the ego vehicle.

17. The method of claim 11, wherein the step of determining the final regenerative braking level comprises determining the second regenerative braking level to be a level 0 in a coasting mode when a relative distance between the forward vehicle and the ego vehicle exceeds a reference dangerous distance.

18. The method of claim 11, further comprising upwardly controlling, by the controller, at least one of the first regenerative braking level and the second regenerative braking level to be an upper level to increase charging when an upward event, in which a relative distance and a relative speed between the forward vehicle and the ego vehicle decrease, occurs.

19. The method of claim 11, further comprising downwardly controlling, by the controller, at least one of the first regenerative braking level and the second regenerative braking level to be a lower level to decrease charging when a downward event, in which a relative distance and a relative speed between the forward vehicle and the ego vehicle increase, occurs.

20. The method of claim 11, wherein the step of determining the final regenerative braking level comprises determining the final regenerative braking level based on an operation of a paddle shift when the paddle shift is operated.

* * * * *